(12) United States Patent
Murayama

(10) Patent No.: US 6,563,961 B1
(45) Date of Patent: May 13, 2003

(54) IMAGE PROCESSING APPARATUS AND CONTROL METHOD CAPABLE OF ROTATING AN ORIGINAL IMAGE

(75) Inventor: Masahiro Murayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/256,756

(22) Filed: Feb. 24, 1999

Related U.S. Application Data

(62) Division of application No. 08/622,299, filed on Mar. 25, 1996, now Pat. No. 5,937,106.

(30) Foreign Application Priority Data

Apr. 4, 1995 (JP) ............................................. 7-078793

(51) Int. Cl.$^7$ ................................................ G06K 9/32
(52) U.S. Cl. ...................................... 382/296; 382/286
(58) Field of Search ................................ 382/284, 289, 382/290, 291, 292, 299, 171, 199, 286, 296; 355/22, 38, 40; 358/296, 530, 451; 399/6, 395, 405, 407

(56) References Cited

U.S. PATENT DOCUMENTS

| | | | |
|---|---|---|---|
| 4,163,212 A | 7/1979 | Buerger et al. | |
| 4,736,437 A | * 4/1988 | Sacks et al. | 382/284 |
| 4,739,231 A | 4/1988 | Miyata et al. | |
| 5,031,116 A | 7/1991 | Shukunami et al. | |
| 5,379,127 A | 1/1995 | Ando | |
| 5,384,645 A | * 1/1995 | Hasegawa et al. | 358/444 |
| 5,461,459 A | 10/1995 | Muramatsu et al. | |
| 5,485,282 A | * 1/1996 | Takeda | 358/435 |
| 5,521,720 A | * 5/1996 | Yoshida | 358/448 |
| 5,670,982 A | 9/1997 | Zhao | |
| 5,694,486 A | 12/1997 | Shigeeda et al. | |

* cited by examiner

*Primary Examiner*—Bhavesh M. Mehta
*Assistant Examiner*—Seyed Azarian
(74) *Attorney, Agent, or Firm*—Fitzpatrick, Cella, Harper & Scinto

(57) ABSTRACT

The size and orientation of a document are detected by determining the length in the horizontal scanning direction and the length in the vertical scanning direction of the document to be read through a reader. According to the detection result, it is determined whether the image of the document needs to be rotated or not so as to satisfy a condition where a shortest dimension among the transmittable widths in the horizontal scanning direction, at which no part of the image is missing, occurs and the dimension in the vertical scanning direction is minimized. According to the determination result, the document image which has been read through the reader is registered in an image memory and the registered image data is read out to transmit it to a receiver through a telephone line.

7 Claims, 9 Drawing Sheets

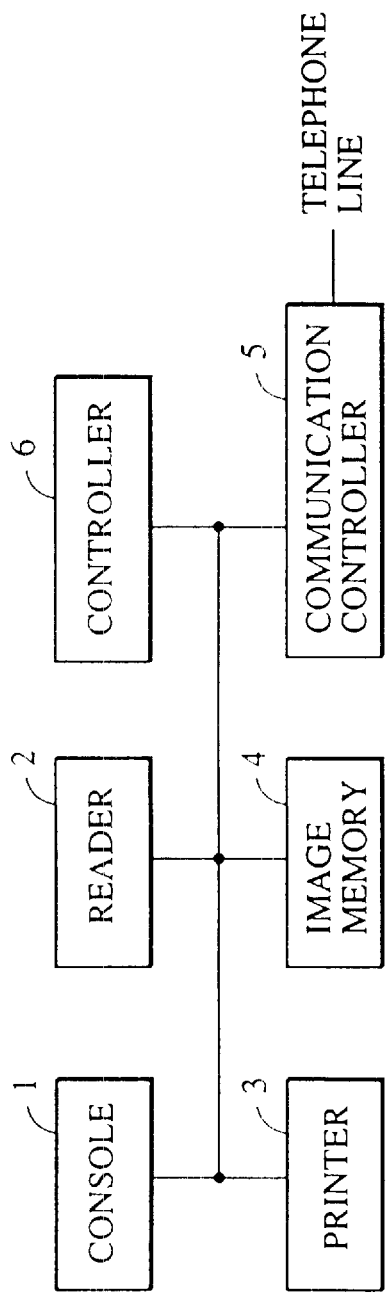
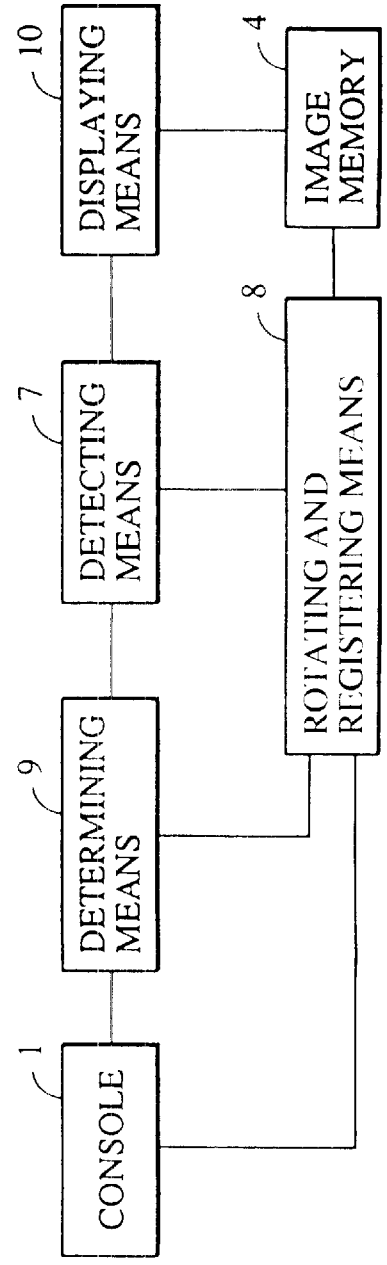

FIG. 3(a)

PAPER SIZE

| A5R |
|-----|
| A5H |
| A4R |
| A4H |
| B4R |
| A3R |

FIG. 3(b)

ROTATION

| NO ROTATION |
|-------------|
| 90-DEGREE ROTATION |

FIG. 3(c)

SIZE PERCENTAGE

| A3→B4 |
|-------|
| A3→A4 |
| B4→A4 |
| SAME SIZE |
| A4→B4 |
| A4→A3 |
| B4→A3 |

FIG. 3(d)

REGISTRATION SIZE

| A4R |
|---------|
| B4R |
| A3R |

FIG. 4(a)

| PAPER SIZE STORING AREA |
|---|

| ROTATION STORING AREA |
|---|

NO ROTATION (= 0)

90-DEGREE ROTATION (= 90)

FIG. 4(c)

| SIZE PERCENTAGE STORING AREA |
|---|

A3→B4 (= 86)

A3→A4 (= 70)

B4→A4 (= 81)

SAME SIZE (= 100)

| REGISTRATION SIZE STORING AREA |
|---|

A4R (= 2)

B4R (= 4)

A3R (= 5)

| | | | | | | | |
|---|---|---|---|---|---|---|---|
| | y1 | OFF | ON | | | | |
| | y2 | OFF | | ON | | | |
| | y3 | OFF | | | ON | | |
| | y4 | OFF | | | | ON | |
| | y5 | OFF | | | | | ON |
| x1 | x2 | | | | | | |
| OFF | OFF | N/A | A5H | A5R | A4R | B4R | A3R |
| ON | OFF | N/A | A4H | | B4R | | A3R |
| ON | ON | N/A | A4H | | A3R | | |

FIG. 9

| SIZE PERCENTAGE / PAPER SIZE | A3→A4 (70%) | B4→A4 (81%) | A3→B4 (86%) | SAME SIZE (100%) | B4→A3 (115%) | A4→B4 (122%) | A4→A3 (141%) |
|---|---|---|---|---|---|---|---|
| A5R |  |  | A4H |  |  | A4R |  |
| A5H |  |  | A4R |  |  | A4H |  |
| A4R |  |  | A4R |  |  |  |  |
| A4H | A4R | A4R | A4H |  | B4R |  | A3R |
| B4R | A4R | A4R | B4R |  | B4H |  | A3H |
| A3R | A4R | B4R |  | A3R |  | A3R |  |

# IMAGE PROCESSING APPARATUS AND CONTROL METHOD CAPABLE OF ROTATING AN ORIGINAL IMAGE

This is a division application of patent application Ser. No. 08/622,299 filed Mar. 25, 1996, now U.S. Pat. No. 5,937,106.

BACKGROUND OF THE INVENTION

1. Field of the Invention

The present invention relates to an image processing apparatus for processing an original image and a control method for the same. More particularly, the invention relates to an image processing apparatus which is capable of rotating an original image, and a control method for the same.

2. Description of the Related Art

In recent years, compound machines which combine copying functions and facsimile functions have become commercially available. Most of these machines are basically copying machines which are equipped with facsimile functions; therefore, documents are frequently set on the readers thereof in the same orientation as that on the copying machines, considering the reading speed. For instance, when a document of A4 size (210 mm×297 mm) which conforms to ISO Standard is read, the A4 document is set so that reading sensors such as CCD line sensors are parallel with the long sides of the A4 document.

For facsimile communication, however, the document must be fed line by line in the horizontal scanning direction on a transmission line. Hence, in the example stated above, if the image, which has been read, were transmitted as it is, then it would be transmitted as a short document in A3 size. For this reason, it has been proposed to rotate the document image, which has been read, so as to switch the read document image in the horizontal scanning direction to the one in the vertical scanning direction by means of a rotating function before transmitting it.

However, even if the aforesaid conventional facsimile apparatus has a rotating function, the rotating function is available only when a document of a particular size such as the A4 size is set on the reader; therefore, it presents the problems described below. Incidentally, XXR (A5R/A4R, etc.) will represent the size applied to a case wherein a document is placed on the reader so that the short sides thereof are parallel to the aforesaid reading sensors and XXH (A5H/A4H, etc.) will represent the size applied to a case wherein a document is placed on the reader so that the long sides thereof are parallel to the reading sensors.

(1) When a document of A5 size or other size, on which the rotating function does not work, is sent in G3 mode, white data must be added to make it A4 size in the horizontal scanning direction to comply with the requirements given under T.30 of ITU-T Recommendation if the document is set in A5R, thus adding to waste.

(2) In a case wherein a control system works to enlarge an A5 document to an A4 document before sending the document, if the document is set in A5H, then it is sent as a short document of A3R. In this case, if the receiver is not capable of receiving the document in the A3 size, then the document is reduced, after all, before sending it, thus involving wasteful processing.

(3) If it is preset whether the rotating processing is to be implemented for each standard size, then no efficient processing can be carried out when a document of a nonstandard size is sent.

SUMMARY OF THE INVENTION

Accordingly, it is an object of the present invention to provide an image processing apparatus and a control method for the same which have solved the problems with the prior art described above.

Another object of the present invention is to provide an image processing apparatus and a control method for the same which reduce wasteful data which is added when an image is output.

A further object of the present invention is to provide an image processing apparatus and a control method for the same which permit efficient output of an image of a document in a desired size.

Yet another object of the present invention is to provide an image processing apparatus and a control method for the same which enable easy recognition of the size and orientation of a document image.

A still further object of the present invention is to provide an image processing apparatus and a control method for the same which enable easy recognition of the size and orientation of an image to be output.

Another object of the present invention is to provide an image processing apparatus and a control method for the same which enable easy recognition of whether rotation should be carried out or not when a document image is output.

Still another object of the present invention is to provide an image processing apparatus and a control method for the same which enable the rotation of an image to be implemented without carrying out wasteful processing.

Yet another object of the present invention is to provide an image processing apparatus and a control method for the same which enable efficient processing based on a size percentage when a document image is enlarged or reduced before it is output.

A further object of the present invention is to provide an image processing apparatus and a control method for the same which enable the transmission of an image which is easy for a receiver to see.

According to a first aspect of the present invention, an image processing apparatus includes a detecting device for detecting a size and orientation of an original image, and a rotating device for rotating the original image. The apparatus further includes a determining device for determining whether rotation by the rotating device should be performed in accordance with a detection result from the detecting device. An output device included in the apparatus outputs the original image after the rotating device rotates the original image when the determining device determines that rotation should be performed. This determination is made by determining whether rotation of the original image is necessary to satisfy a condition in which a dimension of at least one side of the original image is not more than a size to be output by the output device, and a dimension of another side of the original image is minimized.

According to a second aspect of the present invention, an image processing apparatus includes an input device for entering an original image, and a registration device for registering the entered original image. A detecting device in the apparatus detects a size and orientation of the original image before the input device enters the original image. A determination device determines whether the original image should be rotated in accordance with a detection result from the detecting device. A controller performs control so that the registration of the entered original image in the registration device differs according to a determination result from the determination device.

According to yet another aspect of the present invention, a control method for an image processing apparatus includes a step of detecting a size and orientation of an original image, and determining whether the original image should be rotated according to a result of the detecting step. The determining step determines whether the original image should be rotated by determining whether rotation of the original image is necessary to satisfy a condition in which a dimension of at least one side of the original image is not more than a specified size and a dimension of another side of the original image is minimized.

According to a still further aspect of the present invention, a control method for an image processing apparatus includes detecting a size and orientation of the image and entering the original image. The method further includes the step of determining whether the original image should be rotated according to a detection result of the detection step. The method further includes a step of selecting a method for registering the original image entered in the entering step in a memory according to a determination result from the determining step.

The above objects and other objects of the present invention will become apparent from the following detailed description made in connection with the accompanying drawings.

BRIEF DESCRIPTION OF THE DRAWINGS

FIG. 1 is a block diagram showing the entire configuration of a facsimile apparatus which is an embodiment in accordance with the present invention;

FIG. 2 is a block diagram for illustrating the structure of a control unit 6 of FIG. 1;

FIGS. 3(a), 3(b), 3(c), and 3(d) are explanatory diagrams showing a display example of a display unit of a console 1;

FIGS. 4(a), 4(b), 4(c), and 4(d) are explanatory diagrams showing a storing area for display information of the display unit;

FIG. 9 is an explanatory diagram showing the paper size after enlargement or reduction based on the document size and a selected size percentage.

DESCRIPTION OF THE PREFERRED EMBODIMENTS

Figure 5:
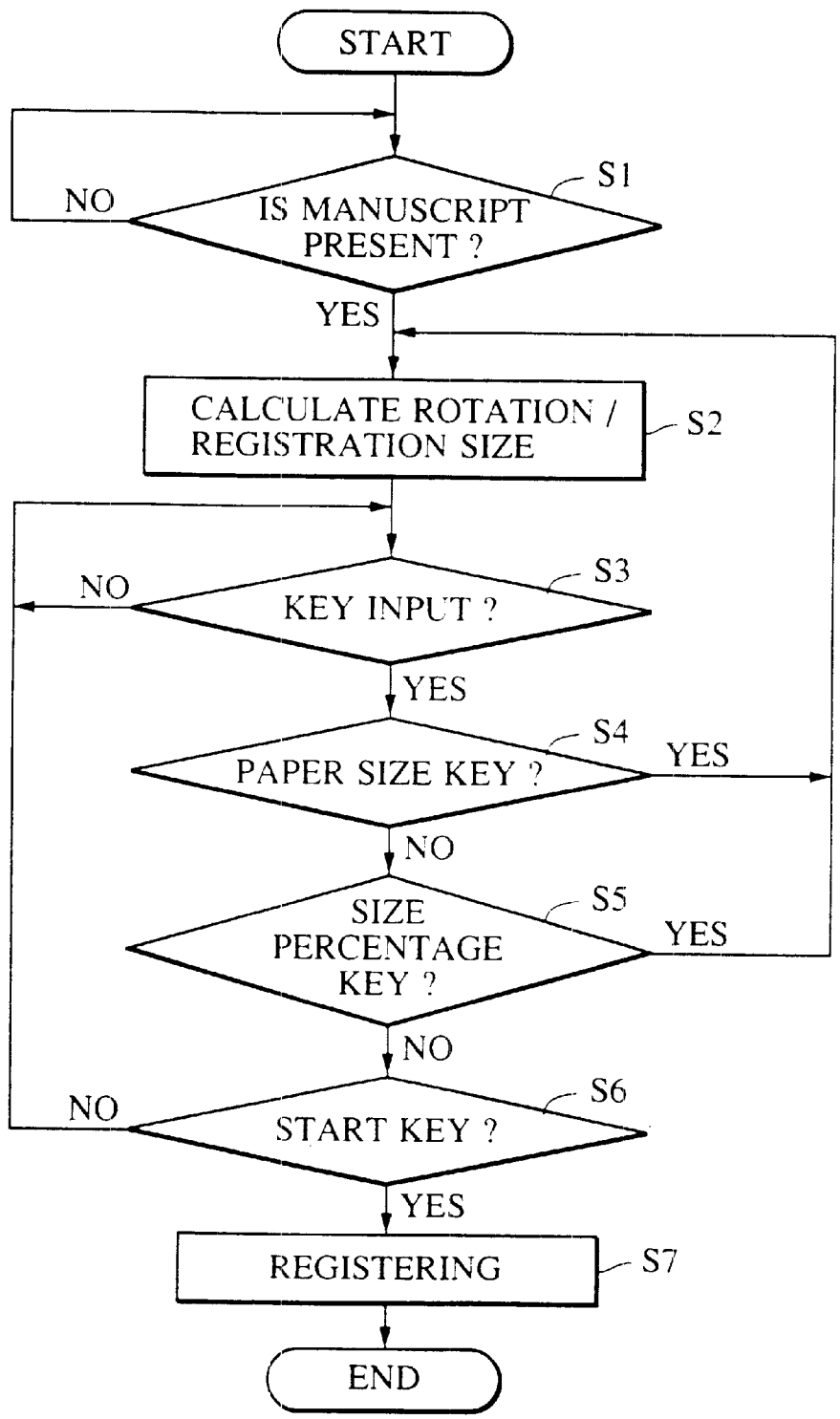
FIG. 5 is a flowchart showing a processing flow from setting a document to registering it.

An embodiment of the present invention will be described in detail with reference to the accompanying drawings.
First Embodiment FIG. 1 is the block diagram showing the entire configuration of a facsimile apparatus according to an embodiment of the present invention.

In the drawing, the console 1 has a ten-key numerical pad, various function keys, a start key, a display unit which will be discussed later, etc. The display unit in console 1 employs an LCD with a touch panel. Reference numeral 2 denotes the reader which reads a document image line by line through CCD line sensors. The reader 2 has sensors for detecting the size of a document in the horizontal scanning direction and the vertical scanning direction, respectively. The reader 2 is designed to read a document image according to the reading size consisting of the length in the horizontal scanning direction and the length in the vertical scanning direction, the size percentage, and the size to be registered in an image memory 4. The size to be registered consists of the number of picture elements in the horizontal scanning direction and the number of picture elements in the vertical scanning direction.

Reference numeral 3 denotes a printer which prints a document or image which has been received or the image which has been read through the reader 2; reference numeral 5 denotes a communication control unit which is primarily comprised of an network control unit (NCU) a modem, and an image coding/decoding device, and which is connected to a telephone line mainly to connect a call, convert the resolution of the image which has been read through the reader 2, code the read image, and decode a received image.

The aforesaid image memory 4 serves to store read document image data and convert the document image data or received image data to the print data for the printer 3; the image memory 4 registers image data in a black-and-white uncompressed image (black=1, white=0) format. The control unit 6 controls the sections stated above; it is primarily comprised of a CPU, a ROM for storing a program, and a RAM for work. The rotation processing for switching the horizontal scanning direction and the vertical scanning direction of the document image which has been read through the reader 2 is performed by the CPU in the control unit 6.

FIG. 2 is the block diagram showing the configuration of the aforesaid control unit 6. The control unit 6 is equipped with detecting means 7 for detecting, through sensors, the length in the horizontal scanning direction and the length in the vertical scanning direction of a document which is placed on the reader 2 and which is to be sent; rotating and registering means 8 for switching the horizontal scanning direction and the vertical scanning direction of the document image which has been read through the reader 2 before registering it in the image memory 4; and determining means 9 for determining, before registering whether the rotating and registering should be implemented to switch the horizontal scanning direction and the vertical scanning direction by the rotating and registering means 8 according to the length in the horizontal scanning direction and the length in the vertical scanning direction of the document which have been detected by the detecting means 7. Before the document image is transmitted, it is automatically given a rotation or no rotation according to the determination result supplied by the determining means 9.

Reference numeral 10 denotes displaying means for displaying the length in the horizontal scanning direction and the length in the vertical scanning direction of the document which have been detected by the detecting means 7. In this embodiment, the displaying means serves as the display unit which is provided in the console 1. The display unit also displays whether the rotating and registering process should be implemented or not when registering an image in the image memory 4 and it further displays the length in the horizontal scanning direction and the length in the vertical scanning direction of an image to be registered.

According to the length in the horizontal scanning direction and the length in the vertical scanning direction of a document or of a document image which has been enlarged or reduced, the determining means 9 determines whether the rotating and registering process should be implemented so that a registration image is oriented in the same direction regardless of whether a document is set horizontally or vertically. The determining means 9 also determines whether rotation should be performed to achieve a size which ensures the shortest horizontal scanning direction without missing any part of the image among the image sizes which can be transmitted by the facsimile apparatus and for minimizing the length in the vertical scanning direction for the particular size.

The console 1 has a means for specifying, by a switch or the like, the length in the horizontal scanning direction and the length in the vertical scanning direction for a document to be read through the reader 2 and a means for specifying the reading size percentage. According to the specified length in the horizontal scanning direction and the specified length in the vertical scanning direction or the new length in the horizontal scanning direction and the new length in the vertical scanning direction which have been obtained by multiplying by a specified size percentage, the determining means 9 determines whether it should automatically rotate the image before registering it in the image memory 4. The reader 2 begins to read the image of a document when the start key is pressed after the document is set on a document rest and a platen is closed. The detecting means 7 determines the document size through sensors according as whether light is reflected or passed through before the platen is closed.

FIGS. 3(a)–3(d) show an example of the display unit of the console 1.

FIG. 3(a) shows an example of a document size which has been recognized by the reader 2; the size which has been selected is highlighted. The size setting can be changed by touching the desired size displayed on the display unit.

FIG. 3(b) is a display example which shows the setting for rotating an image; the current selection is highlighted.

FIG. 3(c) shows a display example of the size percentage, wherein a desired size percentage between standard sizes can be selected; the currently selected size percentage is highlighted. The setting can be changed to a desired size percentage by pressing the desired size percentage display section on the display unit. FIG. 3(d) is a display example of the image size of a document to be registered; the currently selected size is highlighted.

FIGS. 4(a)–4(d) show the storing area for the information associated to the aforesaid display. FIG. 4(a) indicates the document size storing area wherein the information of FIG. 3(a), i.e. the document sizes, is stored. The values to be stored in this document size storing area are 0 to 5 which respectively correspond to the individual sizes. FIG. 4(b) shows the rotation storing area wherein the information of FIG. 3(b), i.e. the need of the rotation, is stored. The values to be stored in this rotation storing area are rotational angles; in this example, no rotation (0) and 90-degree rotation (90) are displayed. FIG. 4(c) shows the size percentage storing area wherein the information of FIG. 3(c), i.e. the size percentages, is stored. The values to be stored in this size percentage storing area are in percentage (%). FIG. 4(d) shows the registration image size storing area wherein the information of FIG. 3(d), i.e. the document image sizes to be registered, is stored. The values to be stored in this area are as shown in the drawing.

The flow of the processing of the embodiment will now be described in conjunction with the flowchart shown in FIG. 5. The flowchart shows the process from the setting of a document to the registration.

Step S1: The system waits until a document has been set on the reader 2; when it determines that the document is present, it proceeds to step S2.

Step S2: The system determines whether the rotating function should be actuated and it also calculates the image size to be registered in the image memory 4. Based on the calculation result, the system displays the document (paper) size, the need of rotation, the size percentage, and the registration size as shown in FIG. 3. Incidentally, the size percentage is initially set to SAME SIZE when a document is placed on the reader. After that, the system proceeds to step S3.

Step S3: The system waits for a key input; as soon as it determines that a key input has been given, it proceeds to step S4.

Step S4: When the key for updating the document size (see FIG. 3(a)) is pressed, the system performs the calculation in step S2 again for the newly selected document size. If any other key than the document (paper) size key is pressed, then it proceeds to step S5.

Step S5: When the key for updating the size percentage (see FIG. 3(c)) is pressed, the system performs the calculation in step S2 again for the newly selected document size. If any other key than the document size key is pressed, then it proceeds to step S6.

Step S6: When the destination is entered and the start key for beginning the reading of a document image is pressed, the system proceeds to step S7. If any other key the document size key is pressed, then it goes back to step S3.

Step S7: The system carries out the processing for the registration in the image memory 4 according to the document size, the need for rotation, the size percentage, and the registration size calculated in step S2. At this time, the system converts the document size to the reading size, which consists of the length in the horizontal scanning direction and the length in the vertical scanning direction. The system also converts the size percentage to the percentage value, and the registration size to the image size. The image size consists of the number of picture elements of the horizontal scanning and the number of picture elements of the vertical scanning, and is to be registered in the image memory 4. The system supplies these converted data to the reader 2 to register the read image data in the image memory 4. At this time, when the rotation is performed, the switching between the image data in the horizontal scanning direction and that in the vertical scanning direction is performed in the CPU incorporated in the control unit 6. In this embodiment, before the document is read, it is determined whether the rotation should be carried out. If it is determined to carry out the rotation, then the read image data in the horizontal scanning direction and in the vertical scanning direction are registered in reverse from the case where the rotation is not carried out. The image data which has been registered in the image memory 4 as described above is subjected to the processes of the resolution conversion, coding, modulation, etc., implemented by the communication control unit 5 before it is handed over to a receiving apparatus.

Figure 6:
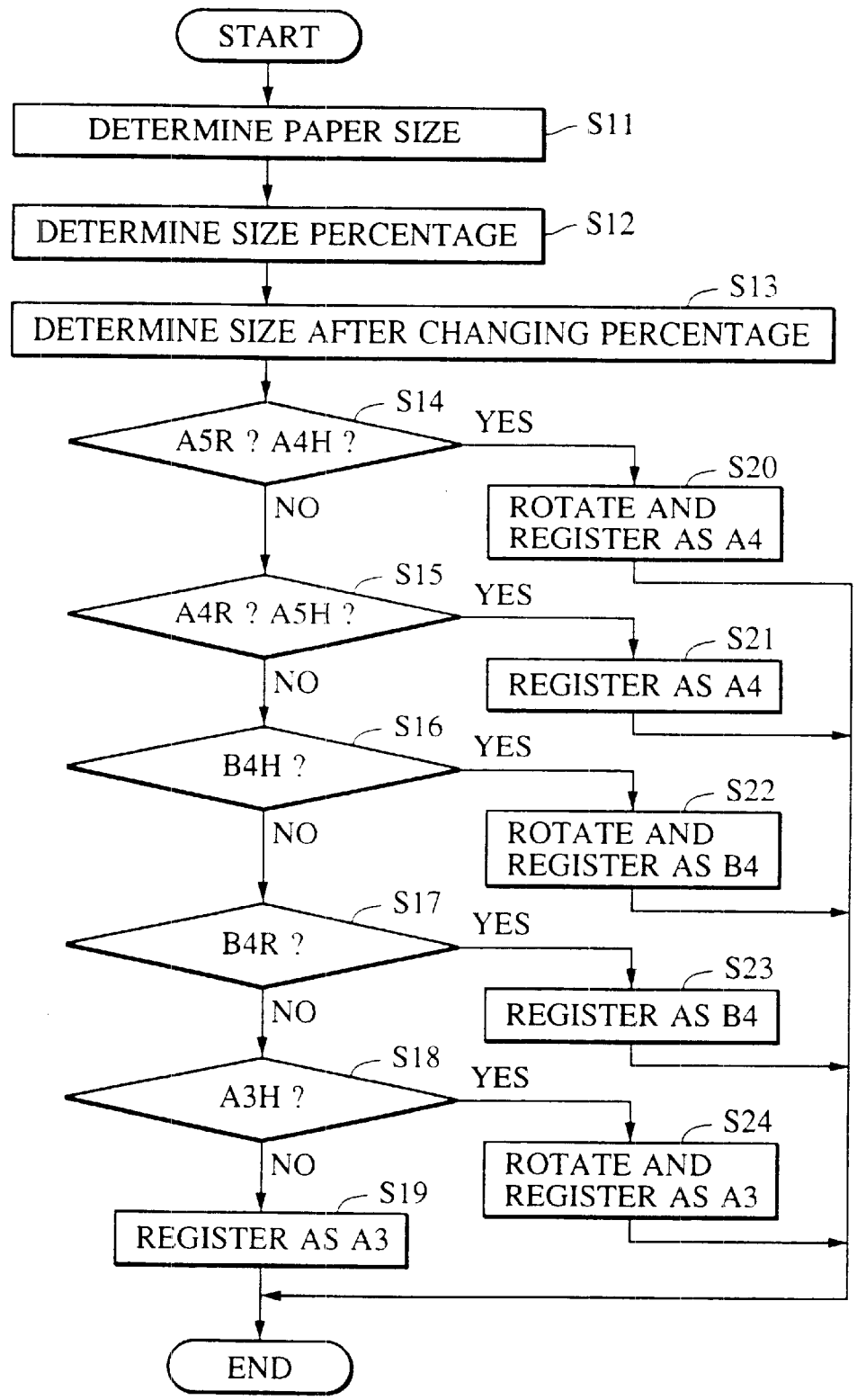
FIG. 6 is a flowchart showing the flow of calculation of rotation and registration size.

The processing for calculating the rotation and registration size will now be described with reference to the flowchart of FIG. 6.

Figures 7, 8:
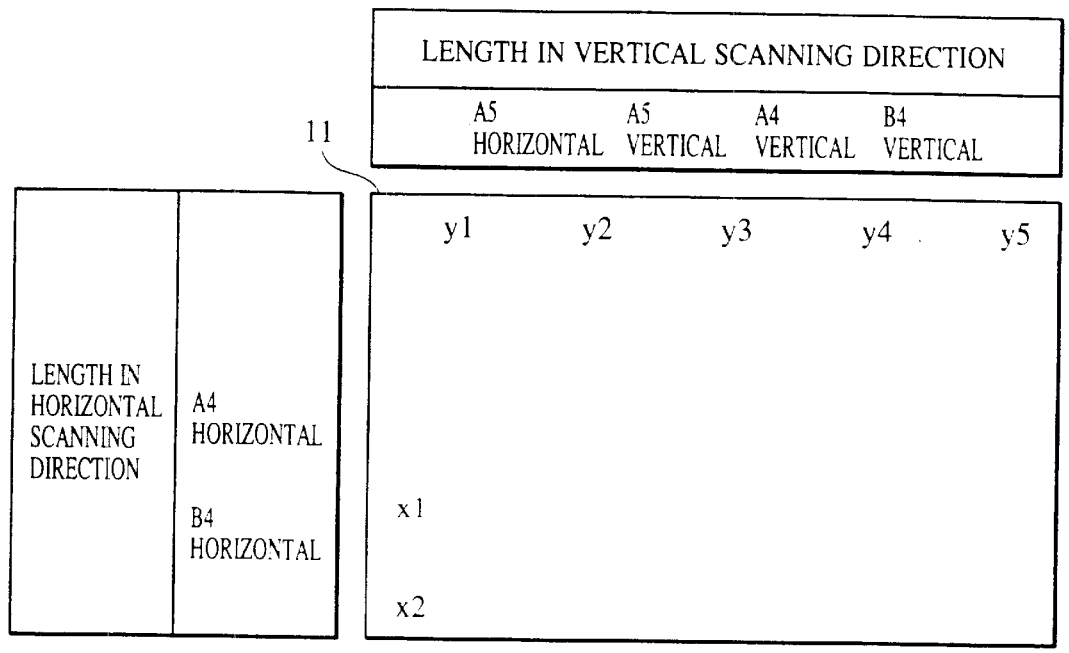
FIG. 7 is an explanatory showing diagram showing the disposing positions of the sensors of a reader 2.
FIG. 8 is an explanatory diagram showing a result of determination of a document size by the sensors.

Step S11: The document size is determined by the sensors of the reader 2. The sensors are positioned as shown in FIG. 7. In FIG. 7, reference numeral 11 denotes a document rest; x1 and x2 denote the sensors for the detection in the horizontal scanning direction; and y1 through y5 denote the sensors for the detection in the vertical scanning direction. FIG. 8 shows the determination result of the document size;

the document size is determined by the ON/OFF states of the sensors (by detecting reflection/transmission); "ON" means that the document has been detected. The document size is determined according to the values of the sensors and the table given in FIG. 8 and the size is set in the document size storing area of FIG. 4(a). If the A5H or A5R document size key (see FIG. 3(a)) is pressed, then the paper size is set in the document size storing area.

Step S12: If the size percentage key (see FIG. 3(c)) is pressed, then the size percentage is determined and the result is set in the size percentage storing area of FIG. 4(c).

Step S13: The size after the new size percentage has been applied is determined. The size is determined by using the table of FIG. 9 according to the document size obtained in step S11 and the size percentage value obtained in step S12. FIG. 9 shows the table for determining the image size after the document has been enlarged or reduced according to the selected size percentage.

Step S14: If the image size obtained in step S13 is A5R or A4H, then the system proceeds to step S20; otherwise, it proceeds to step S15. If at this time, the system goes to step S20, the image in A5R is rotated and sent in a short A4 size.

Step S15: If the image size obtained in step S13 is A4R or A5H, then the system proceeds to step S21; otherwise, it proceeds to step S16. If at this time, the system goes to step S21, the image in A5H is sent in a short A4 size without being rotated.

Step S16: If the image size obtained in step S13 is B4H, then the system proceeds to step S22; otherwise, it proceeds to step S17.

Step S17: If the image size obtained in step S13 is B4R, then the system proceeds to step S23; otherwise, it proceeds to step S18.

Step S18: If the image size obtained in step S13 is A3H, then the system proceeds to step S24; otherwise, it proceeds to step S19.

Step S19: The system sets "no rotation" (=0) in the rotation storing area of FIG. 4(b) and also sets A3R(=5) in the registration size storing area of FIG. 4(d) to register the image as an A3-size image.

Step S20: The system sets "rotation" (=90) in the rotation storing area and also sets A4R(=2) in the registration size storing area to register the image as an A4-size image.

Step S21: The system sets "no rotation" (=0) in the rotation storing area and also sets A4R(=2) in the registration size storing area to register the image as an A4-size image.

Step S22: The system sets "rotation" (=90) in the rotation storing area and also sets B4R(=4) in the registration size storing area to register the image as a B4-size image.

Step S23: The system sets "no rotation" (=0) in the rotation storing area and also sets B4R(=4) in the registration size storing area to register the image as a B4-size image.

Step S24: The system sets "rotation" (=90) in the rotation storing area and also sets A3R(=5) in the registration size storing area to register the image as an A3-size image.

Thus, according to the embodiment, a document can be transmitted by registering it in the same direction regardless of the orientation of the document. Furthermore, even when enlargement or reduction is specified, the document can be transmitted by registering it in the same direction regardless of the orientation of the document. This means that a missing part of a transmitted image or the transmission of wasteful white data can be prevented regardless of the orientation of a set document.

Further, displaying whether the rotation processing is to be carried out or not and also the size to be registered enables the operator to securely recognize the image size to be registered.

In addition, the rotation processing is implemented to set the shortest possible size, which does not provoke a missing part in an image, among the transmittable sizes in the facsimile (the widths in the horizontal scanning direction specified in T.30 of ITU-T Recommendation) and also to minimize the length in the vertical scanning direction. Therefore, the image data to be transmitted can be reduced, thus enabling high-speed transmission.

In the reader 2, the reading sensors move less for A4H than for A4R, permitting quicker reading. Hence, when a document can be read in either orientation (within the range of the reading sensors), quicker registration can be achieved by setting the document in the A4H orientation.

Second Embodiment

In the first embodiment, the description has been given to the case where documents in the standard sizes are read and the read image data is transmitted. In the second embodiment to be set forth below, the description will be given to a case where a rectangular document of an optional size or a nonstandard size is read and the read image data is transmitted. Whether the read image data should be rotated is determined in the same manner as in the first embodiment. More specifically, the image data is rotated so as to set the shortest possible size, which does not provoke a missing part in a document image within the width in the horizontal scanning direction specified in T.30 of ITU-T Recommendation, and to minimize the length in the vertical scanning direction. In the second embodiment, no enlargement or reduction will be performed.

The entire configuration of the facsimile apparatus according to the second embodiment is identical to that shown in FIG. 1 and the description thereof will be omitted.

The length in the horizonal scanning direction and the length in the vertical scanning direction are entered through the console 1 to specify the range up to the A3R size within which a document is to be read, and the document is read by the reader 2 over the range based on the lengths.

Figure 10:
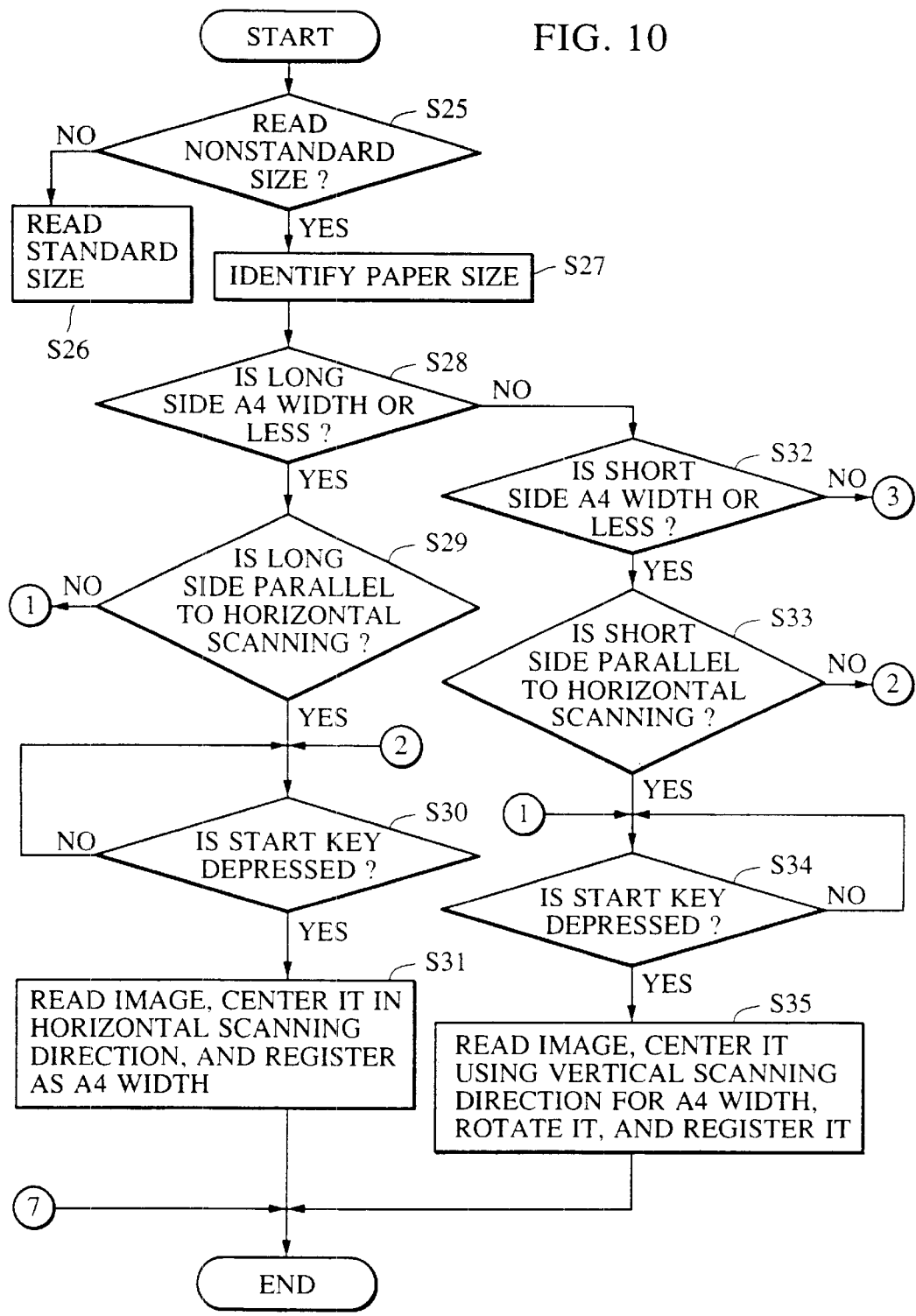
FIG. 10 through FIG. 12 show the flowcharts illustrating the processing flows for reading the image of a document of a nonstandard size.
Figure 11:
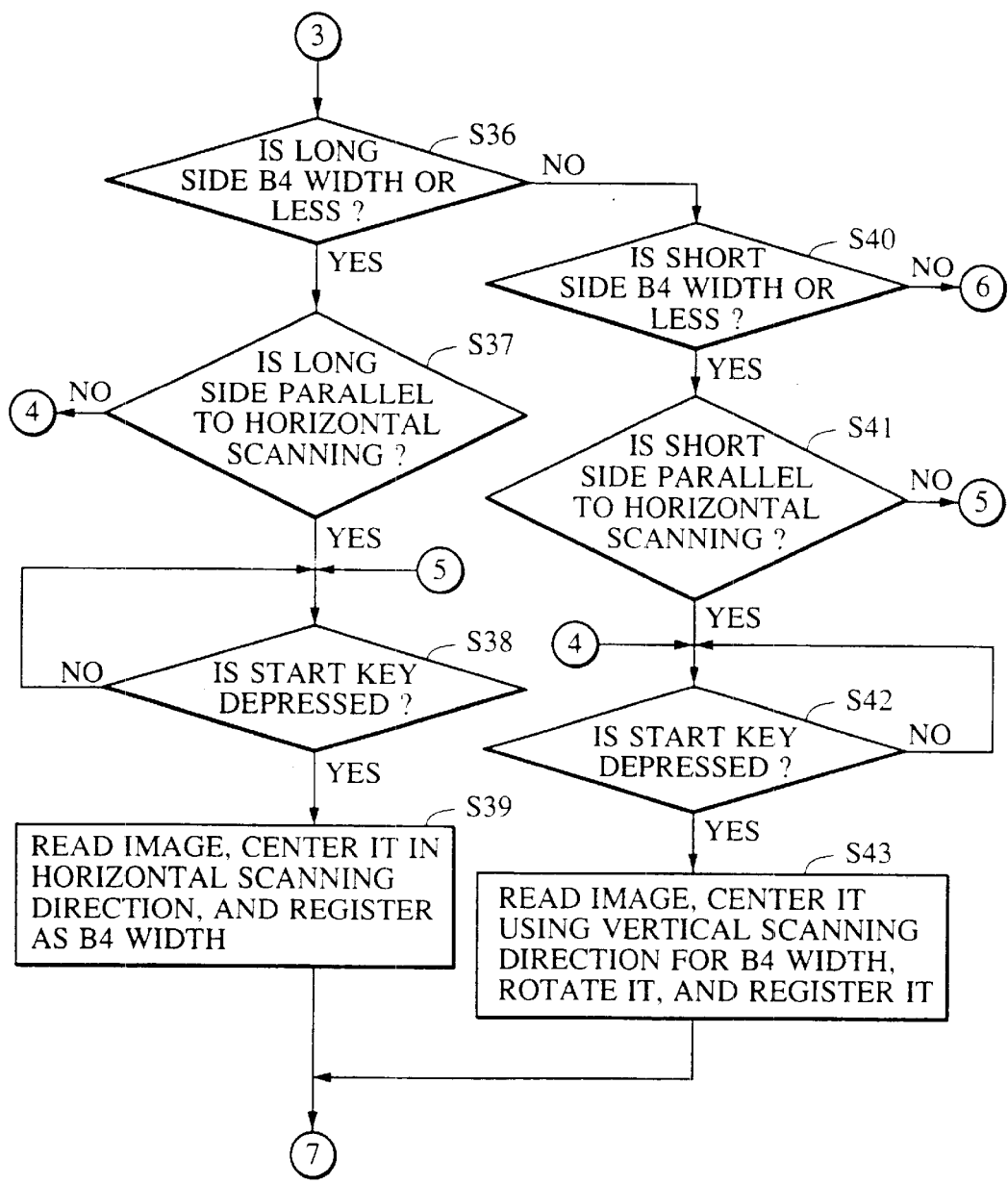
Figure 12:
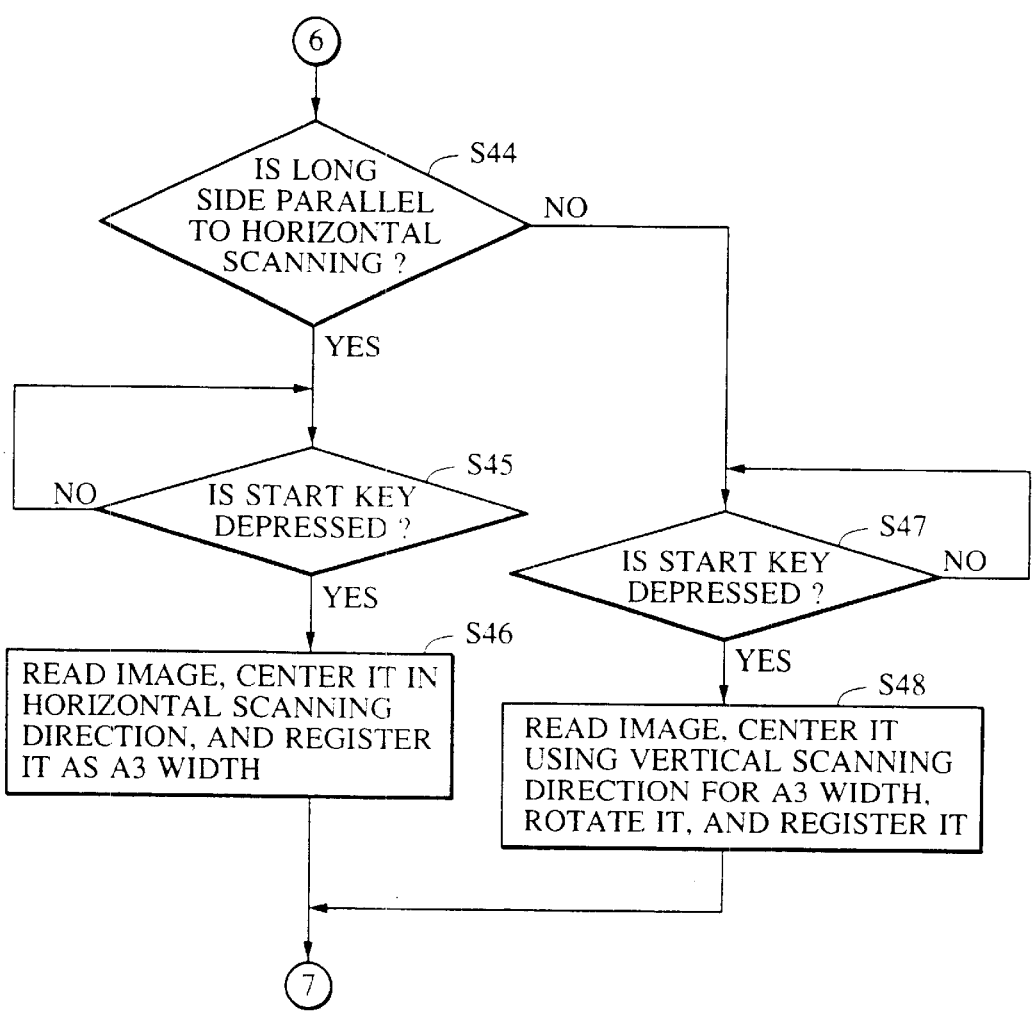

The processing flow according to the second embodiment will be described in conjunction with the flowcharts shown in FIG. 10 through FIG. 12. The flowcharts illustrate the steps from setting a document to registering it.

Step S25: A document is placed on the document rest of the reader 2. The system determines whether the reading of a document in a nonstandard size has been selected. More specifically, the system determines whether the reading size has been specified, i.e. whether the length in the horizontal scanning direction and the length in the vertical scanning direction have been entered, through the console 1. If the determination result is affirmative, then the system goes to step S27; if the determination result is negative, then the system goes to step S26 wherein it carries out the reading of a document in a standard size as in the first embodiment stated above.

Step S27: The system determines the input information on the reading size received from the console 1. More specifically, the system determines the length in the horizontal scanning direction and the length in the vertical scanning direction as observed on the document rest. After that, the system proceeds to step S28.

Step S28: The system determines whether the long sides of the document are of A4 width or less. The A4 width in this case refers to the dimension of a short side of A4-size paper. Hereinafter, the XX width will mean the dimension of a short side of an XX-size document. The A4 width is the minimum transmittable width in the horizontal scanning direction which is specified by T.30. If the long sides of the document are not more than the A4 width, then the system proceeds to step S29; if they are larger than the A4 width, then it proceeds to step S32.

Step S29: The system determines whether the document has been set with the long sides thereof in parallel to the line sensors of the reader 2; i.e., in parallel to the horizontal scanning direction. If the determination result is affirmative, then the system proceeds to step S30; if it is negative, then the system proceeds to step S34.

Step S30: The system determines whether a destination has been entered through the console 1 and the start key for beginning the reading of the document image has been depressed. If the determination result is affirmative, then the system goes to step S31.

Step S31: The system reads a document image through the reader 2 according to the reading size entered through the console 1, then it centers the read image data in the horizontal scanning direction before it registers the image data in the image memory 4, with the horizontal scanning direction being used for the A4 width. This means that white data is added nearly equally to both ends of each line of the read image data.

Step S32: The system determines whether the short sides of the document are the A4 width or less; if it is the A4 width or less, then the system proceeds to step S33, or if it is larger than the A4 width, then the system proceeds to step 536.

Step S33: The system determines whether the document has been set with the short sides thereof in parallel with the line sensors of the reader 2; i.e., in parallel with the horizontal scanning direction. If the determination result is affirmative, then the system proceeds to step S34; if it is negative, the system goes to step S30.

Step S34: The system determines whether a destination has been entered through the console 1 and the start key for beginning the reading of the document image has been depressed. If the determination result is affirmative, then the system proceeds to step S35.

Step S35: The system reads a document image through the reader 2 according to the reading size entered through the console 1, then it centers the read image data by using the vertical scanning direction of the read data for the A4 width and rotates it by 90 degrees before registering the image data in the image memory 4. More specifically, white data is added to both ends of each line so that the dimension in the vertical scanning direction becomes the A4 width, thereby replacing the data in the horizontal scanning direction with that in the vertical scanning direction before registering the image data in the image memory 4. As a result, an image centered with the A4 width in the horizontal scanning direction can be obtained.

After that, the processing from step S36 through step S48 is implemented in the same manner as described above.

Step S36: The system determines whether the long sides of the document are of B4 width or less. If so, the system proceeds to S37, while if the long side of the document is greater than B4 width, the system proceeds to step S40.

Step S37: The system determines whether the document has been set with the long sides in parallel to the line sensors of reader 2; i.e., in parallel with the horizontal scanning direction. If so, the system proceeds to step S38. If the long side is not parallel with the horizontal scanning direction, the system proceeds to step S42.

Step S38: The system determines whether a destination has been entered through the console 1 and the start key for beginning the reading of the document image has been depressed. When the determination result is affirmative, the system proceeds to step S39.

Step S39: The system reads a document image through reader 2 according to the reading size entered through console 1. Then the system centers the read image data in the horizontal scanning direction before registering the image data in image memory 4, with the horizontal scanning direction being used for the B4 width. In this step, white data is added substantially equally to both ends of each line of the read image data to maintain centering.

Step S40: The system determines whether the short sides of the document are of B4 width or less. If so, the system proceeds to step S41, otherwise, the system proceeds to step S44.

Step S41: The system determines whether the document has been set with the short sides thereof in parallel to the line sensors of the reader 2; i.e., in parallel with the horizontal scanning direction. If so, the system proceeds to step S42. Otherwise, the system proceeds to step S38 described above.

Step S42: The system determines whether a destination has been entered through console 1 and the start key for beginning the reading of the document image has been depressed. When the determination result is affirmative, the system proceeds to step S43.

Step S43: The system reads a document image through the reader 2 according to the reading size entered through the console 1. The system then centers the read image data using the vertical scanning direction of the read data for the B4 width, and rotates the read data by 90° before registering the image data in image memory 4. In particular, white data is added to both ends of each line so that the dimension in the vertical scanning direction becomes the B4 width, thereby replacing the data in the horizontal scanning direction with that in the vertical scanning direction before registering the image data in image memory 4. As a result, an image centered with the B4 width in the horizontal scanning direction can be obtained.

Step S44: The system determines whether the document has been set with the long sides thereof in parallel with the line sensors of reader 2; i.e., in parallel with the horizontal scanning direction. If so, the system proceeds to step S45, otherwise, it proceeds to step S47.

Step S45 and S47: The system determines whether a destination has been entered through console 1 and the start key for beginning the reading of the document image has been depressed. When the determination result is affirmative in step S45, the system proceeds to step S46. When the determination result is affirmative in step S47, the system proceeds to step S48.

Step S46: The system reads a document image through reader 2 according to the reading size entered through the console 1. The system then centers the read image data in the horizontal scanning direction before registering the image data in image memory 4, with the horizontal scanning direction being used for the A3 width. This means that white data is added substantially equally to both ends of each line of the read image data.

Step S48: The system reads a document image through reader 2 according to the reading size entered through console 1. The system then centers the read image data by using the vertical scanning direction of the read data for the A3 width and rotates if through data by 90° before registering the image data in image memory 4. Specifically, white data is added to both ends of each line so that the dimension in a vertical scanning direction becomes the A3 width, thereby replacing the data in the horizontal scanning direction with that in the vertical scanning direction before registering the image data in image memory 4. In this way, an image centered with the A3 width in the horizontal scanning direction can be obtained.

Processing is then completed.

The image data thus registered in the image memory 4 is read out in the order of addresses and subjected to the resolution conversion according to the resolution specified through the console 1, the coding by MH, MR, etc., the modulation, etc., performed by the communication control unit 5 before the data is transmitted to the receiving apparatus through a telephone line.

According to the second embodiment described above, efficient transmission is ensured even when a document in a desired size that is in the readable range is read for transmission. Specifically, the system determines the length in the horizontal scanning direction and the length in the vertical scanning direction of a document, i.e. the dimensions of the short sides and the long sides and the orientation of the document. According to the determined dimensions and the orientation of the document, the system determines the shortest size, at which no part of the image is missing, occurs, among the transmittable widths in the horizontal scanning direction; in other words, the system determines whether the image is not more than the width of A4, B4, and A3 in the order in which they are listed according to the requirements given in T.30. The system then determines whether rotation processing is necessary to achieve a minimized dimension in the vertical scanning direction, and it gives the image no rotation or the 90-degree rotation before transmitting it. This minimizes the white data which is added and it also reduces the amount of data as much as possible, thus permitting the transmission of the document image in the unchanged size.

Moreover, the document image is centered in the horizontal scanning direction at the time of transmission; therefore, the center of the recording paper on the receiving apparatus can be nearly matched to the center of the image, enabling an easy-to-see image to be supplied.

In addition, the system decides whether the image needs to be rotated before it starts reading the document. If no rotation is necessary, then the system registers the data for each read line as each line in the horizontal scanning direction in the image memory 4. If the system decides that the image needs to be rotated, then it registers the data for each read line as each line in the vertical scanning direction in the image memory 4; therefore, reading the image in the order of addresses as in the regular manner supplies the image which has been rotated by 90 degrees. This eliminates the need for providing the image memory with a registering area for the rotation processing and also eliminates wasteful processing.

The flowcharts shown in FIGS. 5, 6, and 10 through 12 of the embodiments illustrate the processing flows controlled by the CPU incorporated in the control unit 6 in accordance with the program stored in the ROM in the control unit 6. It is alternatively possible to store the information, which indicates the program, in a memory such as a detachable magneto-optical disk or the like to operate other apparatus.

Thus, according to the present invention, the size and orientation of a document are detected and it is determined whether the image based on the document needs to be rotated or not to satisfy a condition in which the dimension of at least one side of the document is not more than the size to be output and the dimension of another side is minimized. This provides an advantage in that the image data can be output efficiently.

The individual components shown in outline or designated by blocks in the figures are all well known in the image processing arts, and their specific construction and operation are not critical to the operation or best mode for carrying out the invention.

The present invention has been described according to the preferred embodiments; however, the present invention is not limited to the embodiments and various modifications thereof are possible within the range defined in the appended claims.

What is claimed is:

1. A data communication apparatus comprising:

an inputter, which inputs data representing a nonstandard size of an image;

a detector, which detects a size and orientation of the nonstandard size of the image based on the data input by said inputter;

a determiner, which determines whether the image should be rotated in accordance with a detection result obtained from said detector;

a converter, which converts the data input by said inputter so that an image represented by the data will be rotated when said determiner determines that the image should be rotated;

a selector, which selects the data converted by said converter in accordance with a determination result by said determiner;

a processor, which processes the data so that a length of at least one side of an image represented by the data input by said inputter will correspond to a standard size, and a transmitter, which transmits the data after the data is processed by said processor;

wherein said determiner determines whether the image should be rotated in accordance with whether an amount of data decreases when the data is transmitted by said transmitter.

2. A data communication apparatus according to claim 1, wherein said transmitter transmits the data in accordance with a predetermined communication procedure, and said processor processes the data input by said inputter so that the data for the size of an image will correspond to the standard size defined by the predetermined communication procedure.

3. A data communication apparatus according to claim 1, wherein said processor adds blank data so that an image presented by the data input by said inputter will be centrally located.

4. A data communication apparatus according to claim 1, wherein said transmitter selects one of a plurality of sizes and transmits the data.

5. A control method for a data communication apparatus, comprising the steps of:

inputting data representing a nonstandard size of an image;

detecting a size and orientation of the nonstandard size of the image based on the input data;

determining whether the image should be rotated in accordance with a detection result in said detection step;

converting the data input in said input step so that an image represented by the data will be rotated when it is determined in said determining step that the image should be rotated;

selecting the data converted in said converting step in accordance with a determination result in said determining step; and processing the data so that a length of at least one side of an image represented by the data input in said inputting step will correspond to a standard size;

transmitting the data processed in said processing step, wherein said determining step determines whether the image should be rotated in accordance with whether an amount of the data decreases when the data is transmitted in said transmitting step.

6. A computer executable program stored in a computer readable storage medium, said program comprising the steps of:

inputting data representing a nonstandard size of an image;

detecting a size and orientation of the nonstandard size of the image based on the input data;

determining whether the image should be rotated in accordance with a detection result in said detecting step;

converting the data input in said input step so that the image represented by the data will be rotated when it is determined in said determining step that the image should be rotated;

selecting the data converted in accordance with a determination result in said determining step;

processing the data so that a length of at least one side of an image represented by the data input in said inputting step will correspond to a standard size; and transmitting the data processed in said processing step, wherein said determining step determines whether the image should be rotated in accordance with whether an amount of the data decreases when the data is transmitted in said transmitting step.

7. A data communication apparatus according to claim 1, wherein said determiner determines whether the rotation by said converter should be performed by determining whether the image satisfies a condition in which length of the image in at least one of the first and second sides is not more than a predetermined size and a length of the image is another size is set to a minimum size.

* * * * *

UNITED STATES PATENT AND TRADEMARK OFFICE
CERTIFICATE OF CORRECTION

PATENT NO.      : 6,563,961 B1                                                  Page 1 of 1
DATED           : May 13, 2003
INVENTOR(S)     : Masahiro Murayama It is certified that error appears in the above-identified patent and that said Letters Patent is hereby corrected as shown below:

<u>Column 4,</u>
Line 18, "an" should read -- a -- and "(NCU)" should read -- (NCU), --.

<u>Column 5,</u>
Line 27, "as" should read -- to --.

<u>Column 6,</u>
Line 28, "the" should read -- than the --.

<u>Column 12,</u>
Line 64, "and" should be deleted.
Line 67, "size;" should read -- size; and --.

Signed and Sealed this

Second Day of December, 2003

JAMES E. ROGAN
*Director of the United States Patent and Trademark Office*